US012553813B2

(12) United States Patent
Hou et al.

(10) Patent No.: US 12,553,813 B2
(45) Date of Patent: Feb. 17, 2026

(54) ROCK DYNAMIC PHYSICAL PROPERTY MEASUREMENT SYSTEM

(71) Applicant: PetroChina Company Limited, Beijing (CN)

(72) Inventors: Lianhua Hou, Beijing (CN); Senhu Lin, Beijing (CN); Zhenglian Pang, Beijing (CN); Weijiao Ma, Beijing (CN); Guangzhi Liao, Beijing (CN); Jinghong Wang, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 288 days.

(21) Appl. No.: 18/274,791

(22) PCT Filed: Jan. 7, 2022

(86) PCT No.: PCT/CN2022/070649
§ 371 (c)(1),
(2) Date: Jul. 28, 2023

(87) PCT Pub. No.: WO2022/161137
PCT Pub. Date: Aug. 4, 2022

(65) Prior Publication Data
US 2024/0142365 A1    May 2, 2024

(30) Foreign Application Priority Data

Jan. 29, 2021   (CN) .......................... 202110128002.9

(51) Int. Cl.
*G01N 15/08*    (2006.01)
*G01N 1/44*    (2006.01)
*G01N 33/24*    (2006.01)

(52) U.S. Cl.
CPC ........... *G01N 15/0826* (2013.01); *G01N 1/44* (2013.01); *G01N 33/24* (2013.01)

(58) Field of Classification Search
CPC .......... G01N 1/44; G01N 15/00; G01N 15/08; G01N 15/0826; G01N 33/24
See application file for complete search history.

(56) References Cited

U.S. PATENT DOCUMENTS 10,416,064 B2    9/2019    Chen et al.
2010/0089124 A1    4/2010    Katti et al.

FOREIGN PATENT DOCUMENTS

CN    2188205 Y    1/1995
CN    103940722 A    7/2014
(Continued)

OTHER PUBLICATIONS

CN-109270251-A Machine Translation (Year: 2019).*
(Continued)

*Primary Examiner* — Nguyen Q. Ha
(74) *Attorney, Agent, or Firm* — LOZA & LOZA, LLP; Michael Fedrick (57) ABSTRACT

The present disclosure provides a system for measuring dynamic physical properties of a rock, the system being configured to simulate various states of the rock under various pressure and temperature conditions, so as to facilitate the research on dynamically changing physical properties of the rock under those conditions, the system including: a kettle; a sample clamping device including a lower end rod and a fixed upper end rod, and a sample cavity disposed between the upper end rod and the lower end rod and located in the kettle; an overburden pressure device configured to drive the lower end rod to move up and down; a sample sheath configured to sleeve a sample of the rock located in the sample cavity, the sample sheath being contractible inwards under pressure; a confining pressure maintaining device configured to control a pressure in the kettle; and a heater configured to control a temperature in the kettle.

15 Claims, 5 Drawing Sheets

(56) References Cited

FOREIGN PATENT DOCUMENTS

| CN | 104237305 | A | | 12/2014 | | |
|---|---|---|---|---|---|---|
| CN | 105205239 | A | | 12/2015 | | |
| CN | 105388054 | A | | 3/2016 | | |
| CN | 106198578 | A | | 12/2016 | | |
| CN | 106442264 | A | | 2/2017 | | |
| CN | 106442614 | A | | 2/2017 | | |
| CN | 106596377 | A | | 4/2017 | | |
| CN | 107014698 | A | | 8/2017 | | |
| CN | 108956675 | A | | 12/2018 | | |
| CN | 109270251 | A | * | 1/2019 | ............... | G01N 1/44 |
| CN | 209696960 | U | | 11/2019 | | |
| CN | 110857906 | A | | 3/2020 | | |
| CN | 111272635 | A | | 6/2020 | | |
| CN | 111795993 | A | | 10/2020 | | |
| CN | 112945827 | A | | 6/2021 | | |
| KR | 101800383 | B1 | | 11/2017 | | |
| WO | 2005047933 | A1 | | 5/2005 | | |
| WO | 2008106603 | A1 | | 9/2008 | | |
| WO | 2017128479 | A1 | | 8/2017 | | |
| WO | 2020059931 | A1 | | 3/2020 | | |

OTHER PUBLICATIONS

International Search Report for International Patent Application No. PCT/CN2022/070649, dated Mar. 23, 2022.
International search report issued on Mar. 23, 2022 for counterpart Chinese Patent Application No. PCT/CN2022/070649, 3 pages.
First Office Action and search report issued on Jun. 29, 2022 for counterpart Chinese Patent Application No. 202110128002.9, 15 pages.
Second Office Action and Supplemental search report issued on Mar. 5, 2023 for counterpart Chinese Patent Application No. 202110128002.9, 11 pages.
Novelty search report issued by China Patent Information Center on Dec. 9, 2020, 11 pages.

* cited by examiner

ROCK DYNAMIC PHYSICAL PROPERTY MEASUREMENT SYSTEM

CROSS-REFERENCE TO RELATED APPLICATIONS

This application is a National Stage of International Application No. PCT/CN2022/070649, filed Jan. 7, 2022, which claims the priority to Chinese Patent Application No. 202110128002.9, filed on Jan. 29, 2021, and entitled of 'system for measuring dynamic physical properties of rock', which are hereby incorporated by reference in their entireties.

TECHNICAL FIELD

The present disclosure relates to the technical field of petroleum exploration and development, and particularly to a system for measuring dynamic physical properties of a rock.

BACKGROUND

The shale refers to the sedimentary rock with a lamellar foliation and a high content of the total organic carbon (TOC). When the shale has a low maturity, that is, the vitrinite reflectance (Ro) is less than 1.0%, the organic pores in the shale are undeveloped, the viscosity of the crude oil is high, and the flow is difficult, so it is impossible to realize the commercial scale development with the existing horizontal well volume fracturing technology.

The development may be carried out using a technology of generating oil and gas by in-situ heating, which is a technology that converts the unconverted organic matters in the shale into oil and gas by in-situ heating, and extracts the oil and gas generated by in-situ heating and the oil and gas retained in the shale simultaneously. The shale here is a general term for shales with medium or low maturities, that is, having Ro less than 1.0%, including shales with medium or low maturities and immature oil shales.

According to preliminary research, it is estimated that for the shales in the world, the resources of oil recoverable by the technology of generating oil and gas by in-situ heating are more than 1.5 trillion tons, and the resources of natural gas recoverable by the above technology are about 1.3 trillion cubic meters, which means the potential of recoverable resources is large.

The evaluation of the shale characteristics mainly concerns the physical parameters such as porosity, permeability and relative permeability, etc. During the development and the generation of oil and gas by in-suit heating of the shale, the physical properties of the shale will change dynamically in a wide range, e.g. the porosity changes dynamically from 3-5% to 10-35%, the permeability changes dynamically from 0.1 nD or even less to a millidarcy level or even a Darcy level. The productivity of oil and gas generated during in-situ heating of the shale is influenced by the dynamic changes of the physical properties, so it is important to carry out researches on the dynamic change of the physical properties during in-situ heating of the shale for the oil and gas production.

At present, the rock physical properties such as porosity, permeability, relative permeability, etc. are mainly measured in the following methods.

The porosity measurement methods include a mercury intrusion method (MIP), a saturated kerosene method, a helium measurement method, a gas research institute (GRI, a porosity measurement method of the Gas Research Institute of the United States) and a low temperature nitrogen adsorption-desorption method (BET). The mercury intrusion method (MIP) is to measure pore size distributions of some mesopores and macropores, which mainly depends on an external pressure to make mercury overcome a surface tension and enter the pores for measurement. In the saturated kerosene method, a core of a rock sample with an irregular appearance is vacuumized and immersed in kerosene, and then the core saturated with kerosene is weighed in the air, so as to obtain the porosity of the rock based on a retention volume and a density of the immersed kerosene. The helium measurement method is to vacuumize a core, inject helium into the core, and measure volumes of helium isothermally immersed in a rock sample at different pressures, thereby obtaining the porosity of the core. The GRI is to measure the porosity of a dense rock by a pressure attenuation method. The low temperature nitrogen adsorption-desorption method (BET) is to measure surface areas of an adsorbent and a catalyst, and is suitable for the adsorption of porous materials (e.g., shale).

The mercury intrusion method (MIP) and the saturated kerosene method are not suitable for the porosity measurement of the low porosity and permeability dense rock samples; the helium measurement method, the GRI and the low-temperature nitrogen adsorption-desorption method (BET) are suitable for the porosity measurement of the low porosity and permeability dense rock samples, but they are only capable of measuring the porosity of the low porosity and permeability dense rock in a certain state.

The permeability measurement mainly includes a conventional steady-state method and a non-steady pulse attenuation method. In the conventional steady-state method, based on Darcy law, a flow amount is measured by allowing fluid to flow through an object to be measured under a differential pressure; a volume flow amount through the sample per unit time is directly proportional to the differential pressure and a cross-sectional area of the sample, and inversely proportional to a length of the sample and a viscosity of the fluid; and when the external conditions are given, the permeability can be obtained by calculation. In the unsteady pulse attenuation method, based on the one-dimensional unsteady percolation theory, attenuation data of a pore pressure over time in the one-dimensional unsteady percolation process of a sample is combined with initial conditions and boundary conditions defined by corresponding numerical models and test instruments to accurately solve the percolation equation and appropriately control the error, thereby measuring the permeability.

The conventional steady-state measurement method is not suitable for ultra-low permeability measurement; and an instantaneous pulse method of the unsteady state method is suitable for the permeability measurement of the low permeability rock samples, but it may only measure the permeability of the low porosity and permeability dense rock in a certain state.

The measurement methods of relative permeability mainly include a steady-state method and an unsteady state method, both of which are based on a fixed state of the rock sample for measuring.

To sum up, the measurement of rock physical properties such as porosity, permeability and relative permeability is usually based on a fixed state of the rock sample. In the process of in-situ heating, physical properties of the shale will change dynamically. When the above methods are adopted, generally it is only possible to measure the physical properties in a fixed state, while it is difficult to carry out measurements and researches on the dynamically changing physical properties of the shale in the process of in-situ heating.

SUMMARY

The present disclosure aims to provide a system for measuring dynamic physical properties of a rock, so as to simulate various states of the rock under various pressure and temperature conditions to carry out researches on dynamically changing physical properties of the rock under those conditions.

The above objective of the present disclosure may be achieved by adopting the following technical solutions:

The present disclosure provides a system for measuring dynamic physical properties of a rock, the system including: a kettle; a sample clamping device, including a lower end rod and a fixed upper end rod which are distributed up and down respectively, and a sample cavity for accommodating a sample of the rock is disposed between the upper end rod and the lower end rod and is located in the kettle; an overburden pressure device connected to the lower end rod to drive the lower end rod to move up and down; a confining pressure maintaining device, and a sample sheath which is disposed in the kettle to sleeve outside the sample located in the sample cavity, the sample sheath being contractible inwards under pressure; the confining pressure maintaining device is connected to the kettle to control a pressure in the kettle; a heater configured to control a temperature in the kettle; a bottom gas supply device, and a bottom gas inflow pipe with a first end disposed at a bottom of the sample cavity and a second end connected to the bottom gas supply device, the bottom gas supply device supplying gas to the bottom gas inflow pipe; and an upper gas volume device, and an upper gas outflow pipe with a first end disposed at a top of the sample cavity and a second end connected to the upper gas volume device.

The present disclosure has the following characteristics and advantages.

Using the system for measuring dynamic physical properties of the rock, the sample of the rock is mounted in the sample cavity, the upper end rod and the lower end rod fix the sample, and the vertical overburden pressure is applied to the sample through the overburden pressure device.

When the sample sheath shrinks inward under pressure, it can exert lateral pressure on the sample, that is, confining pressure. The pressure in the kettle is controlled by the confining pressure maintaining device, that is, the degree of shrinkage of the sample sheath is controlled, so as to control the confining pressure. The sample sheath surrounds the sample and also plays a sealing role, which can prevent the fluid in the sample from leaking from the side.

The heater controls the temperature in the kettle to realize different temperature conditions.

The bottom gas supply device supplies gas, which flows into the sample through the bottom gas inflow pipe; and the fluid in the sample flows into the upper gas volume device through the upper gas outflow pipe for storage. Due to the sealing effect of the sample sheath, the fluid flowing out of the sample flows through the upper gas outflow pipe to the upper gas volume device, which enables to measure the gas inflow amount and the gas outflow amount of the sample, so that researches can be carried out on the physical properties of the rock in such state.

By changing the overburden pressure, the confining pressure and the temperature, it is possible to simulate various states of the rock to carry out researches on the dynamically changing physical properties of the rock.

BRIEF DESCRIPTION OF THE DRAWINGS

The following drawings are only intended to schematically illustrate and explain the present disclosure, rather than limiting the scope of the present disclosure. In the following drawings.

DETAILED DESCRIPTION

In order to have clearer understanding of the technical features, objectives and effects of the present disclosure, the specific embodiments of the present disclosure will now be described with reference to the drawings. In the description of the present disclosure, 'a plurality of' means two or more unless otherwise specified.

Figure 1:
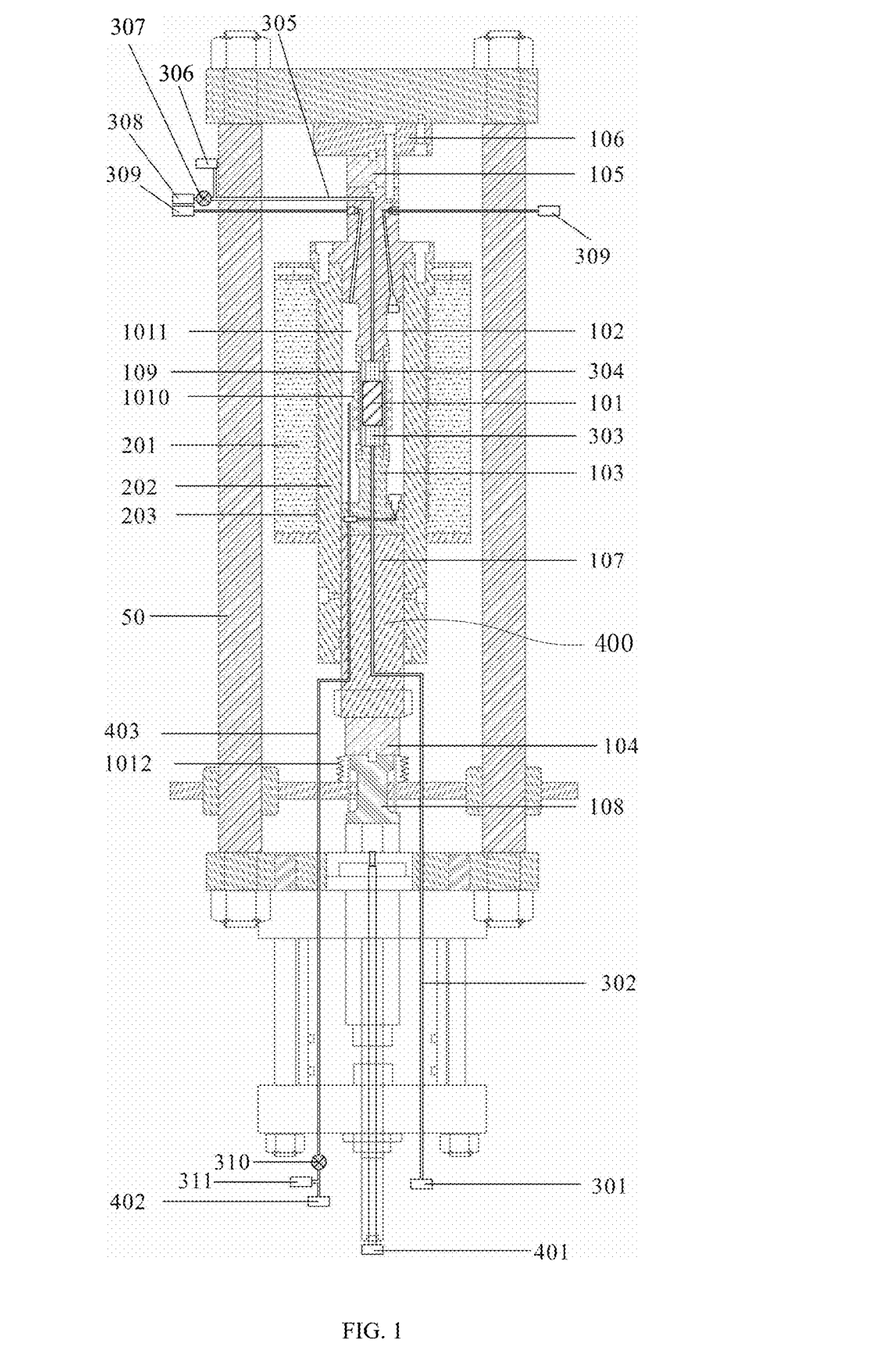
FIG. 1 is a schematic structural diagram of a system for measuring dynamic physical properties of a rock according to the present disclosure.
Figure 2:
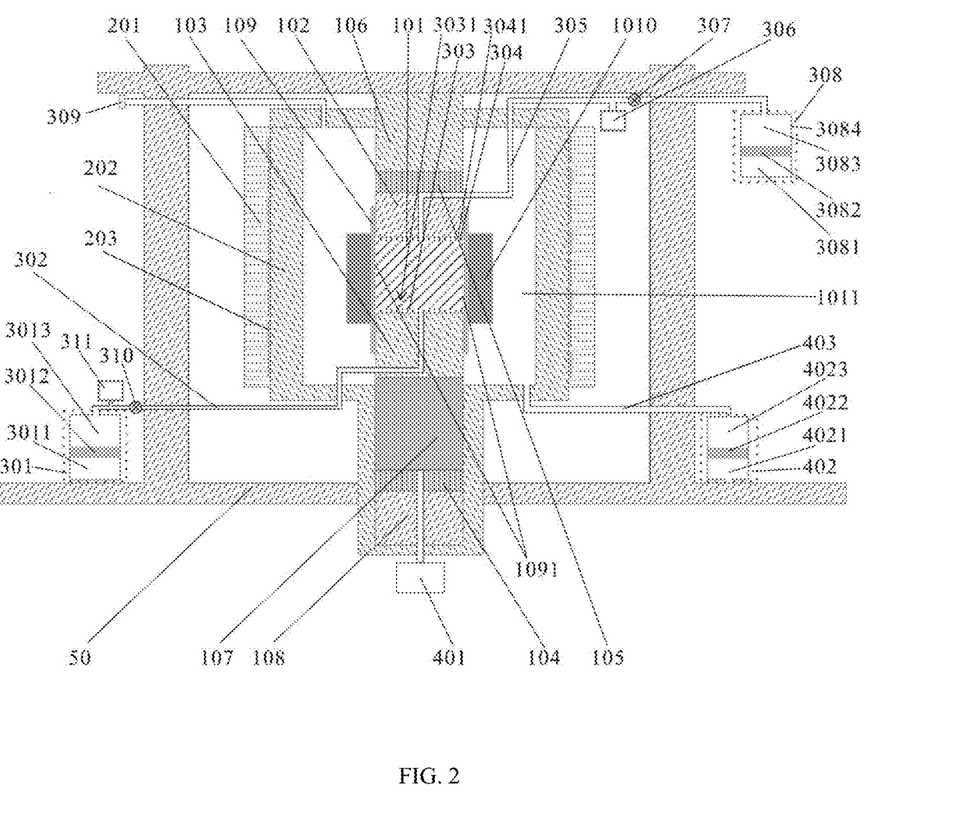
FIG. 2 is a schematic constitutional diagram of the system for measuring dynamic physical properties of the rock illustrated in FIG. 1.
Figure 3:
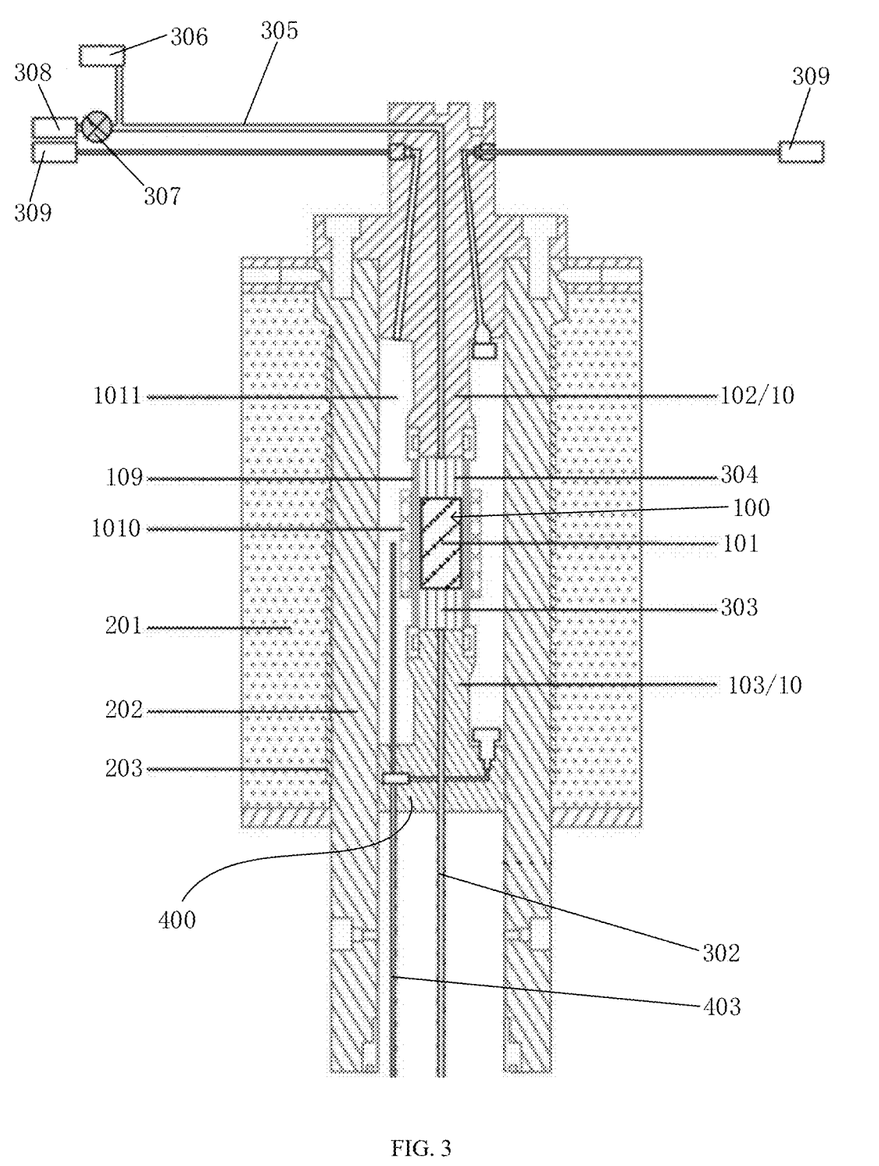
FIG. 3 is a partial schematic diagram of a sample clamping device in the system for measuring dynamic physical properties of the rock illustrated in FIG. 1.

The present disclosure provides a system for measuring dynamic physical properties of a rock, as illustrated in FIGS. 1 to 3, the system including a kettle 202; a sample clamping device 10, an overburden pressure device 400, a confining pressure maintaining device 402, a sample sheath 109, a heater 201, a bottom gas supply device 301, a bottom gas inflow pipe 302, an upper gas volume device 308 and an upper gas outflow pipe 305; the sample clamping device 10 includes a lower end rod 103 and a fixed upper end rod 102 which are distributed up and down respectively, and a sample cavity for accommodating a sample is disposed between the upper end rod 102 and the lower end rod 103 and is located in the kettle 202; the overburden pressure device 400 is connected to the lower end rod 103 to drive the lower end rod 103 to move up and down; the sample sheath 109 is disposed in the kettle 202 to sleeve outside a sample 101 located in the sample cavity, and the sample sheath 109 is contractible inwards under pressure; the confining pressure maintaining device 402 is connected to the kettle 202 to control a pressure in the kettle 202; the heater 201 is configured to control a temperature in the kettle 202; the bottom gas inflow pipe 302 includes a first end of disposed at a bottom of the sample cavity, and a second end connected to the bottom gas supply device 301 which supplies gas to the bottom gas inflow pipe 302; a first end of the upper gas outflow pipe 305 is disposed at a top of the sample cavity, and a second end of the upper gas outflow pipe 305 is connected to the upper gas volume device 308.

By adopting the system for measuring dynamic physical properties of the rock, the sample is mounted in the sample cavity, fixed by the upper end rod 102 and the lower end rod 103, and applied with a vertical overburden pressure by the overburden pressure device 400. When contracting inwards under pressure, the sample sheath 109 may apply a lateral pressure, that is, a confining pressure, to the sample 101. The confining pressure maintaining device 402 controls the pressure in the kettle 202, i.e., a contraction degree of the sample sheath 109, so as to control the confining pressure. The sample sheath 109 surrounds the sample 101 and also has a sealing function, which can prevent the fluid in the sample 101 from leaking laterally. The heater 201 controls the temperature in the kettle 202 to realize different temperature conditions. The bottom gas supply device 301 supplies gas, which flows into the sample through the bottom gas inflow pipe 302 to provide different inflow fluid pressure conditions; and the fluid in the sample 101 flows into the upper gas volume device 308 through the upper gas outflow pipe 305 for storage. Due to the sealing effect of the sample sheath 109, the fluid flowing out of the sample flows through the upper gas outflow pipe 305 to the upper gas volume device 308, so that a gas inflow amount and a gas outflow amount of the sample 101 can be measured to carry out researches on the physical properties of the rock in such state.

By changing the vertical overburden pressure, the confining pressure and the temperature, it is possible to simulate various states of the rock to carry out researches on the dynamically changing physical properties of the rock.

As illustrated in FIGS. 1 and 2, the measurement system includes a frame 50 which is configured to support and fix the whole system; the frame 50 is cylindrical, an interior of which is lined with composite asbestos for thermal insulation. The kettle 202 is made of a Ti—Fe—C alloy and may withstand a temperature of 1000° C. and a pressure of 80 MPa without deformation; a kettle inner cavity 1011 is formed in the kettle 202, and the upper end of the lower end rod 103 and the lower end of the upper end rod 102 are both located in the kettle inner cavity 1011; the confining pressure maintaining device 402 is communicated with the kettle inner cavity 1011 through a lateral pressure inlet pipe 403 to control a pressure in the kettle inner cavity 1011; and the heater 201 controls the temperature in the kettle inner cavity 1011. The heater 201 may be heated by a resistor, with a maximum temperature more than 1000° C.; the temperature detection sensor 203 is mounted between the heater 201 and the kettle 202 and may be configured as a thermocouple to monitoring and automatic control of the heated temperature; optionally, a temperature monitoring tolerance is less than 1° C. The measurement system realizes a test at a high temperature. Optionally, chemical compositions of the kettle 202 are: Ni of 24.0% to 27.0%, Mo of 1.0% to 1.5%, Si being less than 1.0%, Cr of 13.5% to 16.0%, V of 0.1% to 0.5%, Al being less than 0.35%, C being less than 0.08%, S being less than 0.03%, Ti of 1.90% to 2.35%, Mn being less than 2.0%, B of 0.001% to 0.01%, and the remaining composition is Fe.

The upper end rod 102 and the lower end rod 103 may be made of a Ti—Ni—Fe—C alloy to clamp up and down respectively and fix the sample 101. The upper end rod 102 is fitted with an inner wall of an upper opening of the kettle 202 to realize upper sealing of the kettle 202. The upper end rod 102 and the lower end rod 103 may withstand a temperature above 800° C. and a corrosion by $H_2S$ with a concentration above 35%, and work stably for more than 2 years.

The sample 101 accommodated in the sample cavity may be cylindrical in shape, with a diameter ranging from 2.5 cm to 15 cm and a length ranging from 2.5 cm to 25 cm. The sample 101 may be a core sample of shale, mudstone, argillaceous shale, coal or other rock. The surface of the sample is polished.

The sample clamping device 10 includes a lower heat-insulation block 104, an upper heat-insulation block 105 and an upper capping block 106. As illustrated in FIG. 1, the lower heat-insulation block 104 is disposed at the lower end of the lower end rod 103, and the upper end rod 102, the upper heat-insulation block 105 and the upper capping block 106 are sequentially distributed from bottom to top. The upper capping block 106 is fixedly connected to the frame 50, and the lower heat-insulation block 104 and the upper heat-insulation block 105 are made of carbon rubber for heat insulation and insulation between the top and bottom of them, which may withstand a temperature above 800° C. to prevent an heat conduction upward or downward. The upper capping block 106 realizes the fixing between an upper part of the upper heat-insulation block 105 and the frame 50.

In an embodiment of the present disclosure, a gas equalization block 303 for abutting against a lower end of the sample 101 is connected above the lower end rod 103, and the first end of the bottom gas inflow pipe 302 is communicated with the gas equalization block 303 which is provided with a plurality of equalization holes 3030 running through from top to bottom. By using of the gas equalization block 303, the uniformity of the gas entering the bottom of the sample 101 is guaranteed.

Further, a diameter of the equalization hole 3030 is not more than 100 microns, and a density thereof is more than 2,000 pcs/$cm^2$.

In an embodiment of the present disclosure, a gas collection block 304 for abutting against an upper end of the sample 101 is connected below the upper end rod 102, and the first end of the upper gas outflow pipe 305 is communicated with the gas collection block 304 which is provided with a plurality of collection holes 3040 running through from top to bottom. By using of the gas collection block 304, the gas can be uniformly collected at the upper part of the sample 101 and guided into the upper gas outflow pipe 305.

Further, a diameter of the collection hole 3040 is not more than 100 microns, and a density thereof is more than 2,000 pcs/$cm^2$.

The gas equalization block 303 and the upper gas collection block 304 are located at the bottom and the upper part of the sample 101, respectively. The sizes of the gas equalization block 303 and the upper gas collection block 304 are the same as the diameter of the sample 101, and may be made of a Ti—Ni—Fe—C alloy, which may withstand a temperature above 800° C., a corrosion of $H_2S$, and a pressure not less than 80 MPa.

The bottom gas supply device 301 may deliver gas to the sample 101 at a set pressure, apply a fluid pressure to the sample 101 and maintain the same, and apply and maintain a vertical oscillation pressure to the sample. As illustrated in FIG. 2, the bottom gas supply device 301 includes a bottom pressure control piston 3012, one side of which is provided with a supply cavity 3011, and the other side of which is provided with a gas inflow cavity 3013; the second end of the bottom gas inflow pipe 302 is connected to the gas inflow cavity 3013, and the pressurization by the supply cavity 3011 pushes the bottom pressure control piston 3012 to extrude the gas inflow cavity 3013.

In the bottom gas supply device 301, the gas inflow cavity 3013 is maintained at a required pressure by the supply cavity 3011. Optionally, the pressure is hydraulically applied to the supply cavity 3011, and pressure is applied to the gas inflow cavity 3013 by the bottom pressure control piston 3012. The gas inflow cavity 3013 is filled with inert gas, optionally argon.

As illustrated in FIG. 1, the bottom gas inflow pipe 302 is provided with a bottom valve 310 and a bottom pressure detection mechanism 311 located at a side of the bottom valve 310 close to the first end of the bottom gas inflow pipe 302. In some cases, the bottom gas inflow pipe 302 is provided with a flow meter to measure a gas inflow rate.

In an embodiment of the present disclosure, as illustrated in FIG. 2, the upper gas volume device 308 includes an upper pressure control piston 3082, one side of which is provided with an upper pressure control cavity 3081, and the other side of which is provided with a gas outflow cavity 3083. The second end of the upper gas outflow pipe 305 is connected to the gas outflow cavity 3083, and the pressurization by the upper pressure control cavity 3081 pushes the upper pressure control piston 3082 to extrude the gas outflow cavity 3083.

The upper pressure control cavity 3081 maintains the pressure of the upper gas outflow pipe 305, and optionally controls the pressure hydraulically. By controlling and maintaining the pressure through the upper pressure control piston 3082, the amount and temperature of the gas collected by the gas outflow cavity 3083 can be measured, so as to obtain the volume of the collected gas.

As illustrated in FIG. 1, the upper gas outflow pipe 305 is provided with an upper valve 307 and an upper pressure detection mechanism 306 located at a side of the upper valve 307 close to the first end of the upper gas outflow pipe 305. The gas outflow cavity 3083 is provided with a temperature measurement device 3084 for temperature measurement. According to the pressure obtained by the upper pressure detection mechanism 306 and the temperature in the gas outflow cavity 3083 obtained by the temperature measurement device 3084, the gas volume in the gas outflow cavity 3083 under the standard volume can be obtained. The upper pressure detection mechanism 306 may measure the pressure of the upper gas outflow pipe 305, so as to measure a pressure oscillation response. In some cases, the upper gas outflow pipe 305 is provided with a flow meter to measure the gas outflow rate.

Figure 4:
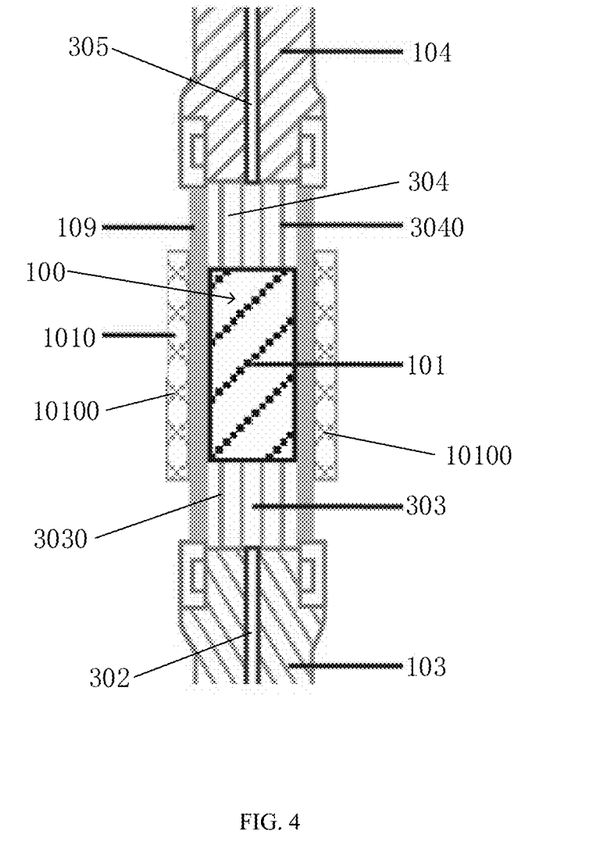
FIG. 4 is a schematic diagram of cooperation between a sample sheath, a gas collection block, a gas equalization block and a sample in the system for measuring dynamic physical properties of the rock illustrated in FIG. 1.

As illustrated in FIG. 4, the sample sheath 109 fixes, seals and clamps the sample 101. The sample sheath 109 may withstand a temperature over 800° C. and a corrosion of $H_2S$, with good flexibility, ductility and sealability. When the pressure in the sample 101 is less than the pressure in the kettle inner cavity 1011, the sealing between the sample sheath 109 and the sample 101 can be ensured. The sample sheath 109 is optionally made of graphite gold, and more optionally high-temperature resistant graphite gold, which is a synthetic material of graphite and gold with good heat resistance and ductility, and can recover its original shape after a pressure recovery. Generally, the gold content is 60% to 70%, and the graphite content is 30% to 40%.

Further, a porous pipe 1010 is disposed in the kettle 202, and the porous pipe 1010 sleeves outside the sample sheath 109. The porous pipe 1010 protects the sample sheath 109 and apply a lateral pressure thereto. By adopting the sample sheath 109 and the porous pipe 1010, it is possible to ensure the sealability of the sample 101 and the transmission of the lateral pressure during the measurement, and overcome the defect that the sealing measurement at a high temperature cannot be realized in the prior art. The porous pipe 1010 is made of a rigid material, and specifically a Ti—Ni—Fe—C alloy.

The holes in the porous pipe 1010 may be radial holes 10100, which run through a side wall of the porous pipe 1010 and are perpendicular to an axial direction thereof. Further, the radial holes 10100 are evenly distributed, with a diameter not more than 100 microns and a density more than 2,000 pcs/cm$^2$, so as to well protect the sample sheath 109 and provide a uniform and steady lateral pressure thereto.

In an embodiment of the present disclosure, as illustrated in FIG. 2, the confining pressure maintaining device 402 includes a confining pressure control piston 4022, one side of which is provided with a confining pressure control cavity 4021, and the other side of which is provided with a confining pressure inlet cavity 4023, which is communicated with the kettle inner cavity 1011 through a lateral pressure inflow pipe 403, and the pressurization by the confining pressure control cavity 4021 pushes the confining pressure control piston 4022 to extrude the confining pressure inlet cavity 4023. The kettle inner cavity 1011 is filled with inert gas, optionally argon. A lateral pressure is provided to the sample 101 by applying a pressure to the inert gas in the kettle inner cavity 1011.

As illustrated in FIG. 1, the kettle 202 is connected to a pressure relief device 309, which reliefs pressure when the pressure in the kettle inner cavity 1011 is abnormal. The pressure relief device 309 may be automatically controlled, and when the pressure in the kettle inner cavity 1011 exceeds a preset value, a pressure relief is automatically started.

In an embodiment of the present disclosure, the overburden pressure device 400 includes an overburden pressure control device 401 and an overburden pressure piston 107 connected to the lower end rod 103, and the overburden pressure control device 401 is connected to the overburden pressure piston 107 to drive the overburden pressure piston 107 to extend and contract up and down, thereby causing the lower end rod 103 to move up and down. The overburden pressure piston 107 applies and maintains a vertical pressure to the lower end rod 103. Specifically, overburden pressure piston 107 controls the required pressure tolerance to less than 0.1 MPa. and the overburden piston 107 may be a cylinder; a cylinder body of the cylinder is fixedly disposed, and an upper end of a piston rod of the cylinder abuts against the lower end rod 103; the overburden pressure control device 401 may adopt a gas pump. As illustrated in FIG. 2, the overburden pressure piston 107 is fixed by an overburden pressure piston bracket 108, and the lower heat-insulating block 104 is disposed between the overburden pressure piston 107 and the overburden pressure piston bracket 108; the overburden pressure piston bracket 108 is sleeved by a protective bellows 1012 which is elastic to correct the position of the overburden pressure piston bracket 108 and prevent the overburden pressure piston bracket 108 from being inclined, thereby protecting the overburden pressure piston bracket 108, reducing the oscillation in the measurement process and improving the measurement accuracy.

In an embodiment of the present disclosure, the measurement system includes a lower longitudinal distance measuring sensor 3031, an upper longitudinal distance measuring sensor 3041, and a plurality of lateral distance measuring sensors 1091 which are symmetrically disposed on a side wall of the sample 101. The lower longitudinal distance measuring sensor 3031 is disposed on a bottom wall of the sample 101, and the upper longitudinal distance measuring sensor 3041 is disposed on a top wall of the sample 101.

Specifically, two lateral distance measuring sensors 1091 may be symmetrically mounted inside the sample sheath 109, and the diameter of the sample 101 under the current condition can be measured by the two lateral distance measuring sensors 1091 arranged symmetrically.

The lower longitudinal distance measuring sensor 3031 and the upper longitudinal distance measuring sensor 3041 may measure various longitudinal lengths of the sample 101 with the changes of temperature and pressure, thereby measuring the longitudinal length of the sample 101 under the current condition.

Therefore, a dynamic diameter of the sample 101 is obtained through the lateral distance measuring sensor 1091, a dynamic length of the sample 101 is obtained through the lower longitudinal distance measuring sensor 3031 and the upper longitudinal distance measuring sensor 3041, and a dynamic volume of the sample 101 during heating is obtained by combining the dynamic diameter and the dynamic length. Due to the influence of temperature and pressure, the volume of the sample 101 may be changed, and the porosity and the permeability are calculated based on the measured dynamic volume, thereby improving the measurement accuracy.

Figure 5:
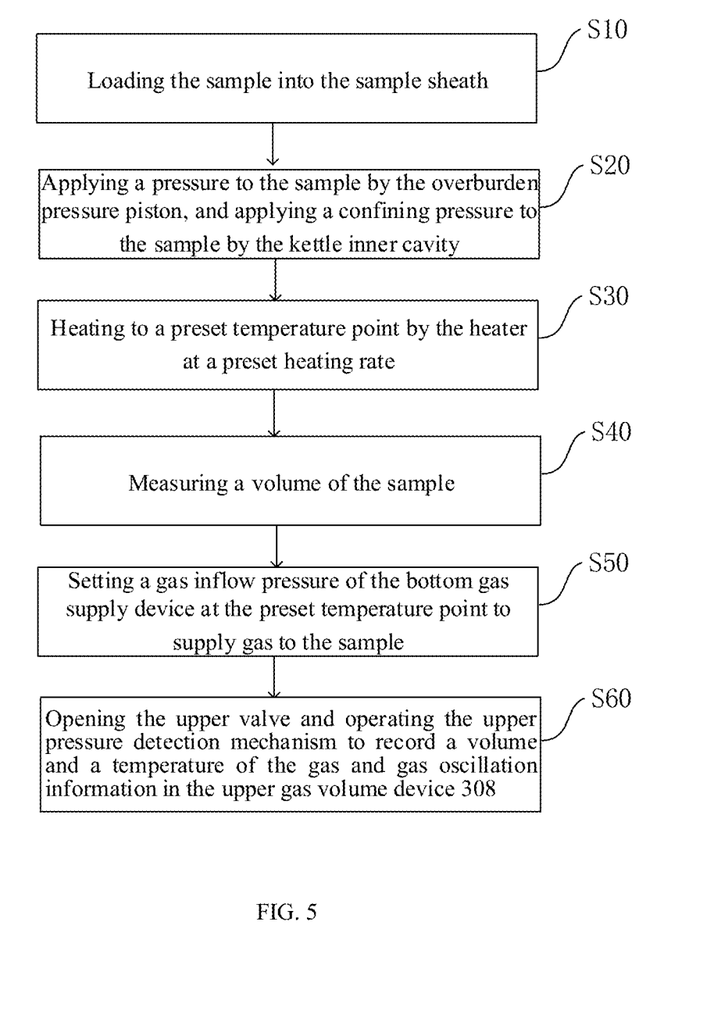
FIG. 5 is an experimental method diagram of a system for measuring dynamic physical properties of the rock according to the present disclosure.

The system for measuring dynamic physical properties of the rock is mainly used for the researches of the generation of oil and gas by in-suit heating of the shale and the development thereof, and the researches of underground in-situ coal gasification and the development thereof. The rock sample 101 is made into a cylinder meeting the experimental size and having a surface polished, and a volume V1 of the sample 101 is measured; as illustrated in FIG. 5, by adopting the system for measuring dynamic physical properties of the rock of the present disclosure, the experimental steps include:

S10: loading a rock sample 101 into the sample sheath 109;

S20: applying a pressure to the sample 101 by the overburden pressure piston 107, and applying a confining pressure to the sample 101 in the sample sheath 109 placed in the kettle inner cavity 1011 of the kettle 202;

S30: heating the kettle 202 to a preset temperature point by the heater 201 at a preset heating rate;

S40: measuring a volume V2 of the sample 101 by using the lower longitudinal distance measuring sensor 3031, the upper longitudinal distance measuring sensor 3041, and the plurality of lateral distance measuring sensors 1091;

S50: setting a gas inflow pressure of the bottom gas supply device 301 at the preset temperature point to supply gas to the sample 101;

S60: opening the upper valve 307, and operating the upper pressure detection mechanism 306 to record a volume and a temperature of the gas and gas oscillation information in the upper gas volume device 308.

In the above experimental steps, the physical properties of the sample at the preset temperature point can be measured through steps S30 to S60; by repeating steps S30 to S60 and adjusting the temperature value of the preset temperature point in step S30, the physical properties of the sample at different temperatures can be measured, so as to obtain the characteristics of the physical properties of the sample changing with temperature and understand the dynamic physical properties of the sample. Through the above experimental steps, it is possible to carry out the continuous measurement at a plurality of temperature values, and draw a changing curve of the physical properties of the sample and the temperature. In the process of generation of oil and gas by in-situ heating of the shale, and in the process of the underground in-situ coal gasification, the environmental temperature of the rock will change, and the physical properties of the rock will change dynamically. By adopting the measurement system for researches, it is helpful to predict the dynamic physical properties of the rock during development.

The gas inflow amount and the gas outflow amount of the sample 101 may be obtained by the gas inflow amount of the bottom gas supply device 301 and the amount of gas collected in the upper gas volume device 308, and in conjunction with the temperature and the pressure of the sample 101 and the volume V2 under the above temperature and pressure, the porosity of the sample 101 under different temperature and pressure conditions can be obtained by calculation.

The gas outflow amount of the sample 101 may be obtained by recording the volume of the gas in the upper gas volume device 308, and in conjunction with the gas inflow amount of the bottom gas supply device 301, the gas outflow amount of the sample 101, the time used and the gas oscillation information, the permeability and the relative permeability of the sample may be obtained by calculation until all of the preset temperature points are measured.

Further, in the S10, a volume of the sample 101 may be measured manually before loading the sample 101 into the sheath 109, and then corrected with the measured volume V1. Both the volume V2 and the volume V1 are measured by the lower longitudinal distance measuring sensor 3031, the upper longitudinal distance measuring sensor 3041 and the plurality of lateral distance measuring sensors 1091, and the accuracy of the volume V2 can be improved by correction.

In step S60, during the test, the upper valve 307 is automatically closed during the operation of the upper pressure detection mechanism 306. When the gas volume change in the sample 101 caused by the pressure change is measured, the bottom valve 310 is automatically closed, and then the upper valve 307 is automatically opened, so that the pressure in the sample 101 changes, and the outflow gas is generated. The upper gas volume device 308 measures the gas volume change caused by the pressure change in the sample 101.

Through the measurement system, a vertical overburden pressure, a lateral confining pressure and a fluid pressure can be applied to accurately simulate the pressure situations during in-situ heating of a rock. Different from the prior art, which usually measures the porosity, the permeability and the relative permeability at the normal temperature, the measurement system of the present disclosure can set reasonable temperature and pressure, simulate and measure the change of dynamic physical properties throughout the in-situ heating of the rock, and measure the porosity, the permeability and the relative permeability by means of the gas oscillation, the pressure attenuation and the pressure-gas volume change of the open and closed systems, thereby measuring the dynamic physical properties simultaneously during the in-situ heating of the rock. The porosity, the permeability and the relative permeability are jointly measured to realize the simultaneous measurement thereof. By simulating the temperature and the pressure during the in-situ heating of the rock, it is possible to measure the porosity, the permeability and the relative permeability of the rock in various states. Through the measurement system, the porosity, the permeability and the relative permeability can be measured by means of the inert gas oscillation, the pressure attenuation and the pressure-gas volume change of open and closed systems, which is suitable for measurements from the low porosity and permeability to the high porosity and permeability, and can simultaneously measure the samples with a level of a wide range of porosities and permeabilities. Through the measurement system, it is possible to accurately measure the dynamic physical properties during in-situ heating of the rock, which is of great significance to further improve the theoretical and technical models of fluid storage and percolation during in-situ heating of the rock and promote the basic experimental researches and the development of related disciplines.

Those described above are just illustrative embodiments of the present disclosure, rather than limitations to the scope of the present disclosure. Any equivalent change or modification made by those skilled in the art without departing from the concept and principle of the present disclosure should fall within the protection scope of the present disclosure.

The invention claimed is:

1. A system for measuring dynamic physical properties of a rock, comprising:
    a kettle;
    a sample clamping device, comprising a lower end rod and a fixed upper end rod which are distributed up and down respectively, wherein a sample cavity for accommodating a rock sample is disposed between the upper end rod and the lower end rod and is located in the kettle;
    a vertical overburden pressure device connected to the lower end rod to drive the lower end rod to move up and down;
    a confining pressure maintaining device, and a sample sheath which is disposed in the kettle to sleeve outside the sample located in the sample cavity, the sample sheath being contractible inwards under pressure; the confining pressure maintaining device is connected to the kettle to control a pressure in the kettle;
    a heater configured to control a temperature in the kettle;
    a bottom gas supply device, and a bottom gas inflow pipe with a first end disposed at a bottom of the sample cavity and a second end connected to the bottom gas supply device, the bottom gas supply device supplying gas to the bottom gas inflow pipe; and
    an upper gas volume device, and an upper gas outflow pipe with a first end disposed at a top of the sample cavity and a second end connected to the upper gas volume device.

2. The system for measuring dynamic physical properties of a rock according to claim 1, wherein a gas equalization block for abutting against a lower end of the sample is connected above the lower end rod, and the first end of the bottom gas inflow pipe is communicated with the gas equalization block which is provided with a plurality of equalization holes running through from top to bottom of the gas equalization block.

3. The system for measuring dynamic physical properties of a rock according to claim 2, wherein a diameter of the equalization hole is not more than 100 microns, and a density thereof is more than 2,000 pcs/cm$^2$.

4. The system for measuring dynamic physical properties of a rock according to claim 1, wherein a gas collection block for abutting against an upper end of the sample is connected below the upper end rod, and the first end of the upper gas outflow pipe is communicated with the gas collection block which is provided with a plurality of collection holes running through from top to bottom of the gas collection block.

5. The system for measuring dynamic physical properties of a rock according to claim 4, wherein a diameter of the collection hole is not more than 100 microns, and a density thereof is more than 2,000 pcs/cm$^2$.

6. The system for measuring dynamic physical properties of a rock according to claim 1, wherein the bottom gas supply device comprises a bottom pressure control piston, one side of which is provided with a supply cavity, and the other side of which is provided with a gas inflow cavity; and the second end of the bottom gas inflow pipe is connected to the gas inflow cavity, and pressurization by the supply cavity pushes the bottom pressure control piston to extrude the gas inflow cavity.

7. The system for measuring dynamic physical properties of a rock according to claim 1, wherein the upper gas volume device comprises an upper pressure control piston, one side of which is provided with an upper pressure control cavity, and the other side of which is provided with a gas outflow cavity; and the second end of the upper gas outflow pipe is connected to the gas outflow cavity, and pressurization by the upper pressure control cavity pushes the upper pressure control piston to extrude the gas outflow cavity.

8. The system for measuring dynamic physical properties of a rock according to claim 1, wherein a porous pipe is disposed in the kettle, and the porous pipe sleeves outside the sample sheath.

9. The system for measuring dynamic physical properties of a rock according to claim 8, wherein a diameter of holes distributed on the porous pipe is not more than 100 microns and a density thereof is more than 2,000 pcs/cm$^2$.

10. The system for measuring dynamic physical properties of a rock according to claim 1, wherein the confining pressure maintaining device comprises a confining pressure control piston, one side of which is provided with a confining pressure control cavity, and the other side of which is provided with a confining pressure inlet cavity connected to the kettle, and pressurization by the confining pressure control cavity pushes the confining pressure control piston to extrude the confining pressure inlet cavity.

11. The system for measuring dynamic physical properties of a rock according to claim 1, wherein the overburden pressure device comprises an overburden pressure control device and an overburden pressure piston connected to the lower end rod, and the overburden pressure control device is connected to the overburden pressure piston to drive the overburden pressure piston to extend and contract up and down to cause the lower end rod to move up and down.

12. The system for measuring dynamic physical properties of a rock according to claim 1, further comprising a lower longitudinal distance measuring sensor, an upper longitudinal distance measuring sensor, and a plurality of lateral distance measuring sensors which are symmetrically disposed on a side wall of the sample, wherein the lower longitudinal distance measuring sensor is disposed on a bottom wall of the sample, and the upper longitudinal distance measuring sensor is disposed on a top wall of the sample.

13. The system for measuring dynamic physical properties of a rock according to claim 1, wherein the upper gas outflow pipe is provided with an upper valve and an upper pressure detection mechanism located at a side of the upper valve close to the first end of the upper gas outflow pipe.

14. The system for measuring dynamic physical properties of a rock according to claim 1, wherein the bottom gas inflow pipe is provided with a bottom valve and a bottom pressure detection mechanism located at a side of the bottom valve close to the first end of the bottom gas inflow pipe.

15. The system for measuring dynamic physical properties of a rock according to claim 1, wherein chemical compositions of the kettle are: Ni of 24.0% to 27.0%, Mo of 1.0% to 1.5%, Si being less than 1.0%, Cr of 13.5% to 16.0%, V of 0.1% to 0.5%, Al being less than 0.35%, C being less than 0.08%, S being less than 0.03%, Ti of 1.90% to 2.35%, Mn being less than 2.0%, B of 0.001% to 0.01%, and the remaining composition is Fe.

* * * * *